United States Patent [19]

DeGuire et al.

[11] 4,128,617

[45] Dec. 5, 1978

[54] TREATMENT OF ZINC CALCINES FOR ZINC RECOVERY

[75] Inventors: Marcel F. DeGuire, Southbury; John H. Wirag, III, Bethel, both of Conn.

[73] Assignee: Newmont Exploration Limited, Danbury, Conn.

[21] Appl. No.: 814,659

[22] Filed: Jul. 11, 1977

[51] Int. Cl.² .......................................... C01G 9/06
[52] U.S. Cl. .................................. 423/106; 423/109
[58] Field of Search ............... 423/109, 145, 146, 106; 75/120

[56] References Cited

U.S. PATENT DOCUMENTS

| | | | |
|---|---|---|---|
| 3,684,490 | 8/1972 | Steintueit | 423/109 |
| 3,985,857 | 10/1976 | Menendez et al. | 423/109 |

OTHER PUBLICATIONS

Rastas et al., "Treatment of Iron Residues in the Electrolytic Zinc Process," TMS Paper A73-11, (Feb. 1973), AIME, N. Y., pp. 6, 7; 14–17.

Gordon et al., "Improved Leaching Techniques in the Electrolytic Zinc Industry," Metallurgical Transactions, vol. 6B, Mar. 1975, pp. 43–53.

*Primary Examiner*—Brian Hearn
*Attorney, Agent, or Firm*—Pennie & Edmonds

[57] ABSTRACT

A process for the treatment of zinc calcine containing zinc oxides, zinc sulfates and zinc ferrites, which comprises neutral leaching, hot acid leaching, jarosite precipitation and recycling of the jarosite containing pulp whereby there is obtained increased zinc extractions, improved settling and filtering characteristics of the leach pulp, simplified operation and process control and increased ammonium removal.

20 Claims, 8 Drawing Figures

Conventional Electrolytic Zinc Process

Modified Electrolytic Zinc Process According to Invention

Jarosite Process

Jarosite Acid Wash

Outokumpu Conversion Process

Goethite Process

Preferred Flowsheet of Invention

Alternate Flowsheet of Invention

TREATMENT OF ZINC CALCINES FOR ZINC RECOVERY

BACKGROUND OF THE INVENTION

Most commercially viable processes for the treatment of zinc concentrates in the recovery of zinc and other valuable metals utilize the basic electrolytic zinc process. The steps involved in processing zinc concentrates via the electrolytic process include: roasting of the zinc concentrates to eliminate sulfur and produce zinc calcine; leaching the zinc calcine to produce an impure zinc sulfate solution; precipitating the iron that may be present; purifying the zinc sulfate solution to produce a "pure" electrolyte free of deleterious elements; and recovering the refined zinc metal by electrolysis.

In the above-described roasting step, three major zinc compounds are produced from the original sulfide mineral: zinc oxide (ZnO), zinc ferrite ($ZnO.Fe_2O_3$), and zinc sulfate ($ZnSO_4$), representing respectively approximately 75%, 23% and 2% of the total zinc as in the case of high-iron (10% Fe) zinc concentrates.

The objective of the overall leaching step is to dissolve or "leach" as much of the zinc in the calcine as possible, minimize the harmful impurities in the solution, while at the same time obtaining a pulp which can be easily thickened and filtered. Dilute sulfuric acid (spent electrolyte) is typically used as the solvent for leaching.

With respect to the solubility of the various zinc compounds, whereas zinc oxide is soluble in dilute sulfuric acid according to the reaction: $ZnO + H_2SO_4 \rightarrow ZnSO_4 + H_2O$, and zinc sulfate is soluble in water, zinc ferrites require more intense leaching conditions, to wit, high temperature and high acid concentrations, than does the zinc oxide and as such it is soluble according to the reaction: $ZnO.Fe_2O_3 + 4H_2SO_4 \rightarrow Fe_2(SO_4)_3 + ZnSO_4 + 4H_2O$.

Thus, it can be seen that the leaching step may be broken down in two parts, the first being neutral leaching and the second hot acid leaching, viz. the zinc oxide and zinc sulfate are dissolved in the neutral leach and the zinc ferrites are dissolved in hot acid leach. The purpose of the neutral leach is to dissolve as much zinc oxide as possible from the calcine so as to produce a suitable solution for subsequent purification and to also produce a pulp that can be easily filtered or thickened. The objective of the hot acid leach is to dissolve as much of the remaining zinc (zinc ferrites) as is economically feasible.

Because of the difficulties of removing the iron entering the system in a readily filterable form, most electrolytic zinc plants, at least until recent years, have utilized only the neutral leaching step. This problem has now been overcome, to a certain extent, with the advent of the "jarosite process" and the "geothite process", whereby the iron in solution is removed as a readily filterable precipitate. As noted, the purpose of such iron removal step is to remove the iron introduced into the system from the hot acid leach solution (leaching of zinc ferrites) while minimizing zinc losses. Normally, the solution produced from the iron removal step is then returned back to the neutral leach step for recovery of the contained zinc with the iron-containing precipitate being discarded. A conventional electrolytic zinc process employing a known iron precipitation step is depicted in FIG. 1.

Three major viable methods of removing the iron from acid leach solutions are presently in commercial operation throughout the world in major zinc refineries. These may be designated as the "jarosite process", the "Outokumpu conversion process", and the "goethite process." These processes, in so far as the iron removal steps are concerned, are schematically depicted in FIGS. 3, 5 and 6.

The "jarosite process", named after the resulting iron precipitate, is described in U.S. Pat. Nos. 3,434,947 and 3,493,365. A detailed description of this process, and its various modifications, is also described in an article entitled "Improved Leaching Technologies In The Electrolyte Zinc Industry", Metallurgical Transactions B, Vol 6 B, March 1975, pages 43–53. As shown in FIG. 3, this process, which is the most widely used of the three methods for the removal of iron, consists of adding a small amount of ammonium, sodium or potassium ion, as in the form of ammonium hydroxide, to the acid leach solution, followed by the neutralization of the solution to an acid equivalent of less than about 10 gms/liter (g/l) $H_2SO_4$. Neutralization may be carried out with any convenient neutralizing agent, and most preferably with calcine as shown in FIG. 3. Under such conditions, the iron that was present in the solution is precipitated out as jarosite, $(NH_4,Na,K)Fe_3(SO_4)_2(OH)_6$, according to the following reaction:

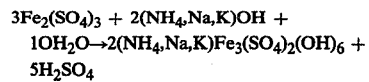

The resulting pulp is then filtered to yield a filtrate and a jarosite precipitate residue. The filterate is recirculated back to the neutral leaching step and the residue is discarded.

The "Outokumpu conversion process", named after the developers of this iron removal process, is described in U.S. Pat. No. 3,959,437. As depicted in FIG. 5, this process in effect combines the hot acid leaching step, in the treatment of zinc calcines, with the subsequent iron removal or jarosite precipitation step. As such, this process is particularly applicable for the treatment of zinc calcines which perchance contain no significant amounts of other metal values such as lead, silver, gold, etc., since under these conditions there is no need to filter after the hot acid leach stage so as to produce a salable residue. The overall reaction of the "Outokumpu conversion process" may be depicted as follows:

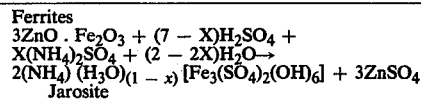

The essential difference between the "Outokumpu conversion process" and the "jarosite process" is that in the "Outokumpu conversion process" dissolution of the zinc ferrite, contained in neutral leach residues, and the precipitation of the dissolved iron as jarosite, are carried out simultaneously (See FIG. 5). In the jarosite process, on the other hand, these two operations are carried out in sequence (See FIG. 3). Moreover, by means of prior addition of ammonia to the circuit and careful control of spent electrolyte additions, the "Outokumpu conversion process" may be carried out under conditions such that the dissolution of iron from zinc ferrite and its subsequent precipitation as jarosite are combined and carried out at high acidity, i.e., at an acid content of about 30-50 g/l $H_2SO_4$ as compared to an acid content of about 5-10 g/l $H_2SO_4$ for the "jarosite process". Thus, the addition of a neutralizing agent (zinc calcine) is not required and higher zinc extractions are obtained.

The "goethite process", likewise named after the resulting iron precipitates, is described in U.S. Pat. No. 3,652,264 and also discussed in the article entitled "Improved Leaching Technology In The Electrolytic Zinc Industry". This process, as depicted in FIG. 6, removes iron from the acid leach solution by precipitating the iron as goethite (FeOOH). Unlike the relatively simple "jarosite process", the "geothite process" is rather involved and consists of (1) reduction of the ferric iron in the acid leach solution to the ferrous state by reaction with sulfide zinc concentrate; (2) filtration of the pulp; (3) preneutralization of the filtrate with zinc calcine to a pH of approximately 2; and (4) oxidation of the ferrous iron with air or oxygen, back to the ferric state, while maintaining the pulp at a ph of approximately 2 with staged additions of calcine. A crystalline, readily filterable goethite iron precipitate is formed which is filtered off and discarded. The reduction and precipitation of iron occurs as follows:

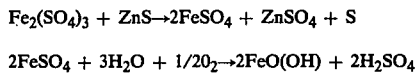

$$Fe_2(SO_4)_3 + ZnS \rightarrow 2FeSO_4 + ZnSO_4 + S$$

$$2FeSO_4 + 3H_2O + 1/2O_2 \rightarrow 2FeO(OH) + 2H_2SO_4$$

With respect to the "jarosite process", this process has the obvious disadvantage that calcine, which is added during the iron precipitation step, results in a carryover of the zinc ferrite in this calcine to the discarded jarosite precipitate. This leads to a lower overall zinc extraction. Moreover, it has been found by applicants in the course of extensive laboratory and pilot plant testing that overneutralization of the jarosite pulp with calcine could become troublesome; that is, it has been found very difficult to determine and control the precise amount of calcine that is to be added such that there is a tendency to add an excessive amount of calcine in order to ensure adequate precipitation of the jarosite. Not only does overneutralization result in poor filtration characteristics, but it also lead to increased zinc losses in the residue due to increased amounts of zinc ferrites remaining in the residue.

Concerning the foregoing disadvantage of the "jarosite process", and particularly in respect to the carryover of valuable zinc ferrite, a "jerosite acid wash process" has been proposed. This process is depicted in FIG. 4 and is also the subject of U.S. Pat. No. 3,684,490 and is likewise described in the article entitled "Improved Leaching Technology In The Electrolyte Zinc Industry". In the "jarosite acid wash process", the precipitated jarosite and unreacted zinc ferrites (from the calcine added for neutralization) are releached with spent electrolyte under similar conditions as those in the hot acid leach. This is possible due to the low resolubility of jarosite in acid solution once it has been precipitated. However, the "jarosite acid wash process" of course has the inherent disadvantages of necessitating additional reaction vessels as well as another solid-liquid separation step.

Likewise, tests performed in respect to the "Outokumpu conversion process" established the following inherent drawbacks: (1) long reaction times and high reacton temperatures are required (24 hours at 95° C.); (2) when the resulting filtrate, which is high in iron (about 10 g/l Fe vs about 1 g/l Fe for the "jarosite process") is recycled back to the neutral leaching step, the additional iron present creates extreme settling and filtration problems.

Similar laboratory test work conducted by applicants upon the "geothite process" has clearly demonstrated that long reaction times are necessary (approximately 16 hours) and that the reaction must be carried out at high temperatures (approximately 95° C.) in order to conduct the complex series of operations required in this process. Moreover, the process is subject to sensitive pH conditions and the further requirement of careful control during stage additions of calcine.

Thus it can be seen that all of the commercially viable processes presently known for the precipitation of dissolved iron in the electrolytic recovery of zinc have certain inherent disadvantages; these may be summarized as follows: (1) the addition of calcine to the jarosite pulp in the "jarosite process" results in high zinc losses since zinc ferrites contained in the calcine added for neutralization are not efficiently dissolved and may result in filtration problems; (2) the "jarosite acid wash process" (for recovery of the foregoing zinc ferrites), requires additional equipment as well as extra process steps; (3) the "Outokumpu conversion process" requires long reaction times at high temperatures and results in the recycle of high quantities of iron; and (4) the "goethite process" is rather complex and requires sensitive control.

SUMMARY OF THE INVENTION

Accordingly, the object of this invention is to provide an improved method for the treatment of zinc ores and concentrates that would give increased zinc extractions when compared to existing processes and at the same time will overcome the various disadvantages attendant in all of the known methods for the removal of dissolved iron.

A further object of this invention is to improve the settling and filtering characteristics of the leach pulps.

A yet further object of this invention is to simplify the operation and process control.

Another object of this invention is to remove more ammonium ion from leach liquors which have been subjected to a high ammonium ion input, as during demanganization according to U.S. patent application, Ser. No. 682,442, assigned to the assignee of the instant application.

Generally, the invention relates to the treatment of roasted zinc sulfide concentrates by neutral leaching, hot acid leaching and iron removal by the formation of jarosite via the electrolytic zinc process. More particularly, the invention is an improvement over the "jarosite process" in that, amongst other features, the jarosite precipitate is not separated for discard from the zinc sulfate solution after the iron removal step but instead the pulp is recycled. In another embodiment of the instant invention, the pulp is settled and thereafter both the solution and thickened pulp are recycled.

DESCRIPTION OF THE PREFERRED EMBODIMENTS

Figure 2:
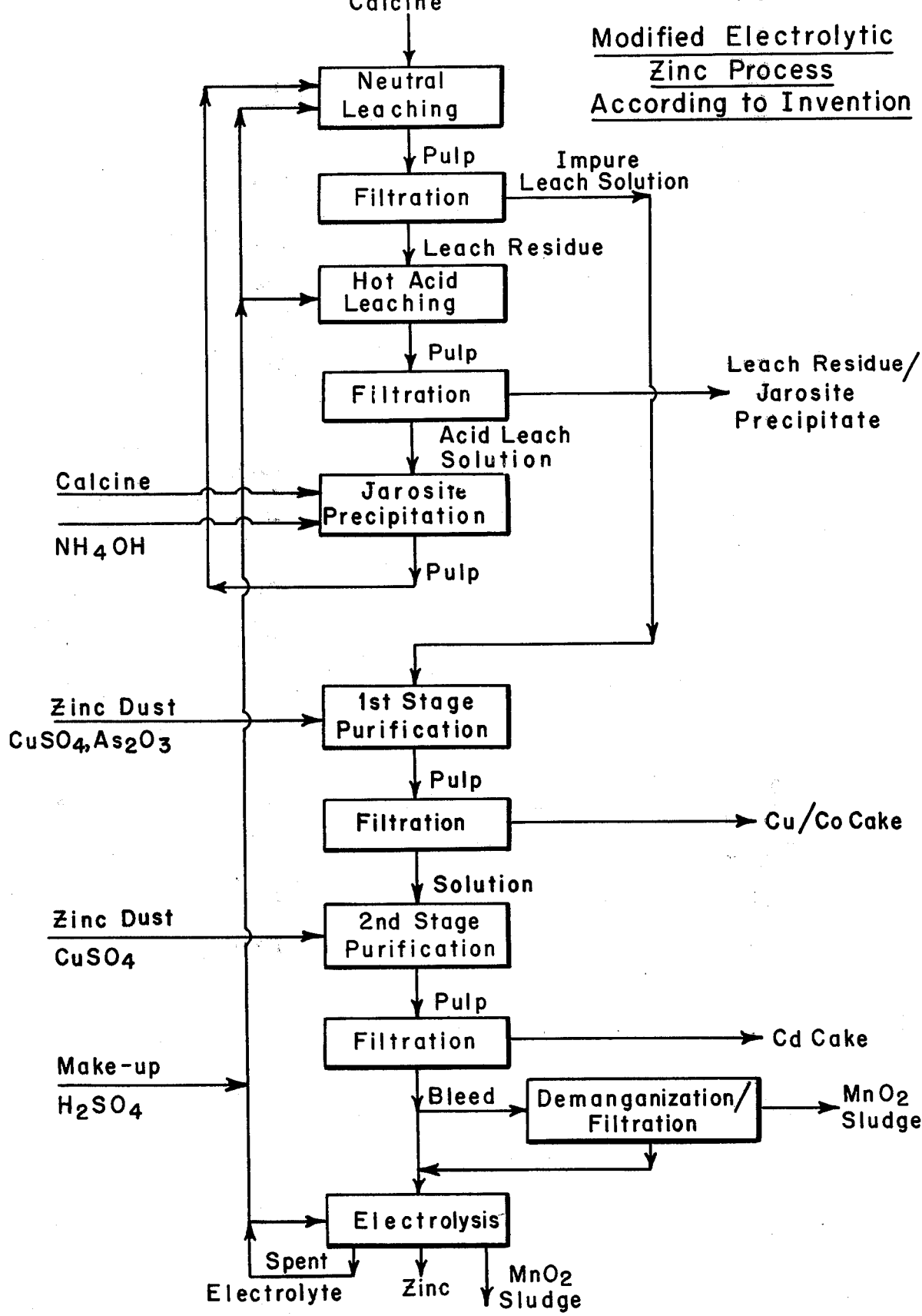
FIG. 2 — presents a flowsheet of the electrolytic zinc process incorporating the instant invention.
Figure 7:
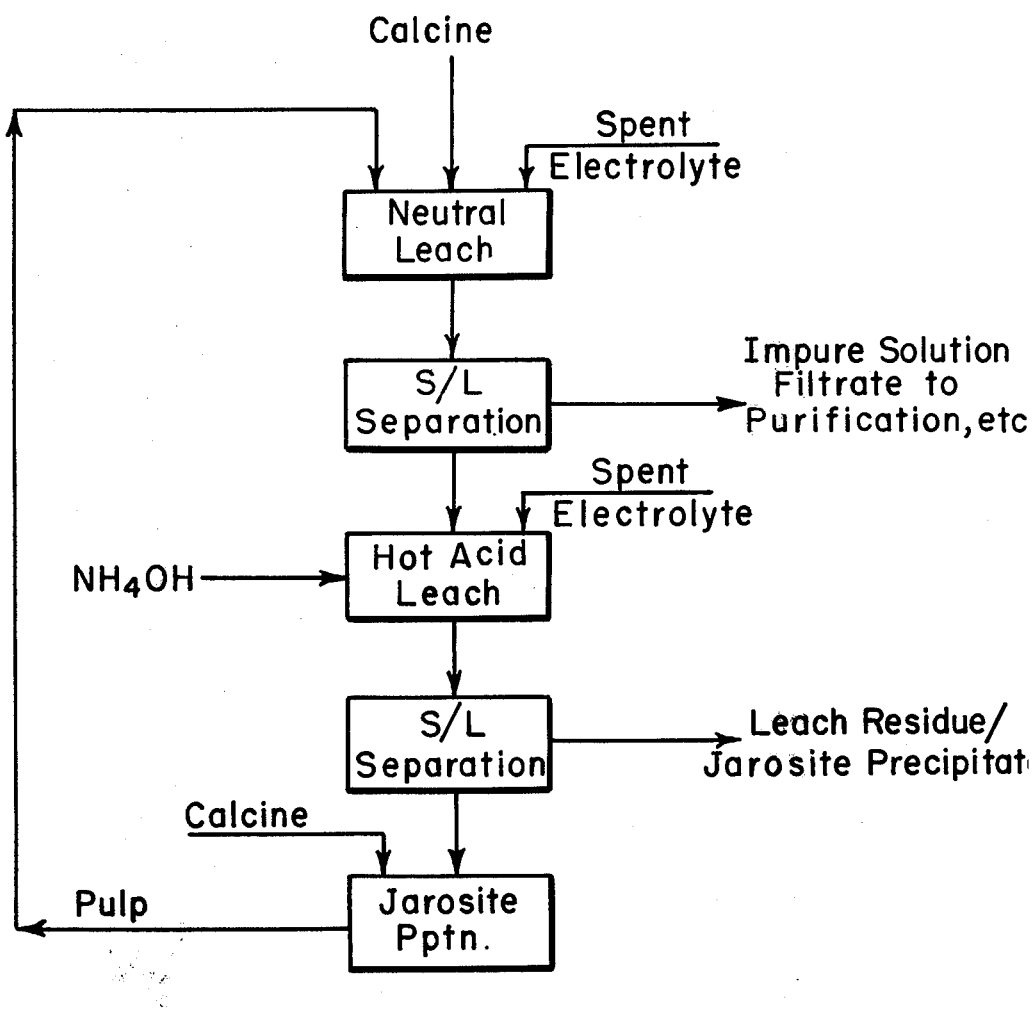
FIG. 7 — presents the flowsheet of the preferred way of carrying out the instant invention.
Figure 8:
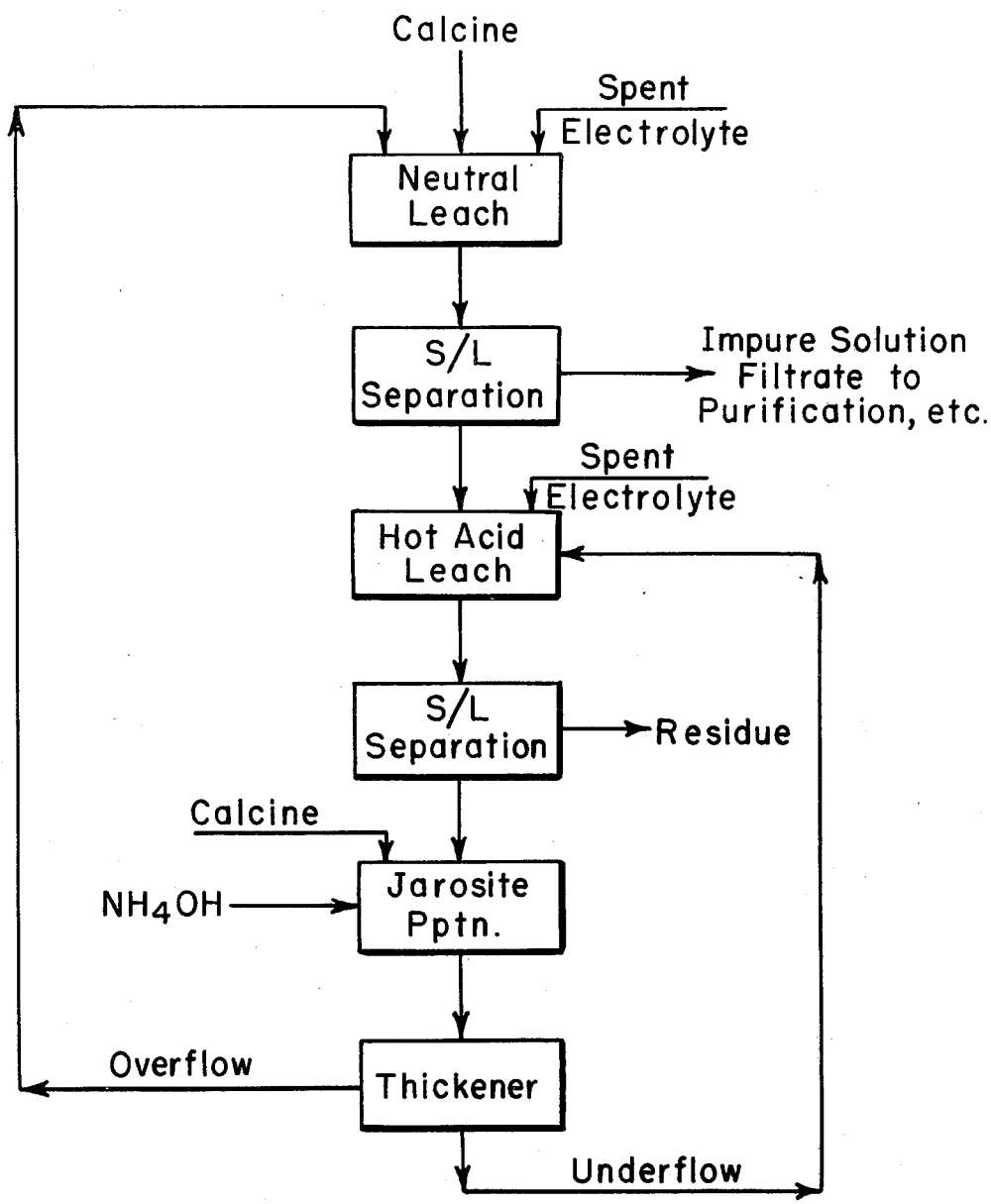
FIG. 8 — presents the flowsheet of an alternate way of carrying out the instant invention

As shown in FIGS. 2, 7 and 8, the process of the instant invention may be considered to occur in three stages and may be carried out batchwise or continuously. In the first stage, which may be designated as the "neutral leach" stage, zinc calcine, containing zinc oxides, zinc sulfates and zinc ferrites as well as the pulp from the third stage, as in the case of the preferred embodiment of the instant invention, is treated with an effective volume of an aqueous sulfuric acid containing solution. The acid solution may be "return acid" or "spent electrolyte" from the electrolytic zinc process or new dilute sulfuric acid (See FIG. 2). The concentration of the acid solution is normally about 200 g/l $H_2SO_4$ but can vary from about 100 to 300 g/l $H_2SO_4$. The mixture is reacted for a period of time sufficient to dissolve a substantial amount of the zinc oxides and the zinc sulfates. Although the reaction time is in no way critical, the time may vary from about 15 min. to 3 hrs and most preferably from about 1 to 2 hrs. The reaction is accomplished at an initial ph of about 2, although the pH may vary from about 1.4 to 2.5, the same in effect determining the amount of acid solution that is added. The reaction temperature, which is not critical, may be from about 50° C. to about 90° C. and preferably at a temperature of about 65° C. The pulp is then contacted with an effective amount of neutralizing agent(s), most preferably additional zinc calcine, said neutralizing agent being added in an amount until the pulp is neutralized to a subsequent pH of from about 4.0 to 5.3 and preferably about pH 5. The neutralized pulp is then allowed to settle and the solution decanted off, or the pulp may be settled and then filtered. The resulting solution filtrate, commonly known as an impure solution filtrate, is sent on to purification and then electrolysis for recovery of zinc and companion metals (copper, cadmium, cobalt, etc.). The resulting thickened pulp or filter cake, normally called a neutral leach residue, and containing primarily zinc ferrites, as well as any undissolved zinc oxides and zinc sulfates, is then passed on to stage two.

In stage two, which may be designated the "hot acid leach" stage, the neutral leach residue from stage one is contacted with an effective volume of an aqueous sulfuric acid containing solution, usually also "return acid" or "spent electrolyte" from the electrolyte zinc process or new dilute sulfuric acid, at a temperature from about 80° C. to the boiling point and most preferably at a temperature of greater than about 90° C. and for a time sufficient to dissolve a substantial amount of the zinc ferrites (as well as any zinc oxides and zinc sulfates not previously dissolved in the neutral leach stage). Again, the reaction time is not critical although this is usually accomplished in a period up to about 2 hours and most preferably in a period of 2 to 3 hours. The amount of acid added to stage two to dissolve the zinc ferrites has been found to be such as to obtain a final acid concentration of about 20–50 g/l $H_2SO_4$ in that stage. The resulting pulp is then allowed to settle and the solution decanted off, or the pulp may be settled and then filtered. The solution produced from this stage, termed an acid leach solution, is then sent on to stage three for iron removal. The residue from this stage, an acid leach residue containing the jarosite precipitate, after washing, can be discarded or further processed for recovery of contained values.

In stage three, the acid leach solution, produced in stage two, is treated for iron removal. Iron removal is attained by the formation of jarosite: an effective amount of a neutralizing agent, most preferably zinc calcine, is added to the acid leach solution in the presence of an effective amount of an alkali to precipitate the ferric iron as jarosite. The amount of the neutralizing agent is added such that the acid concentration of the solution is reduced to below about 20 g/l $H_2SO_4$ and most preferably to below about 10 g/l $H_2SO_4$. During the addition of the neutralizing agent, which may be added over a sufficient period of time as would precipitate the jarosite, the same not being critical and may be up to about 4 hours, and preferably over a period of about 3 ½ hours, the mixture is also best reacted at a temperature from about 80° C. to the boiling point and most preferably at a temperature greater than about 90° C. In so doing, if the alkali concentration is high enough, the ferric iron will be precipitated as jarosite. The amount of alkali need be only sufficient to cause the precipitation of jarosite although normally the concentration of the alkali should be about 2 to 6 g/l and most preferably about 3 g/l. The alkali used can, for example, be a compound containing ammonium, sodium or potassium ions. The alkali can be added as a hydroxide, sulfate, carbonate, or any other suitable soluble form. Thus, if the alkali is ammonium hydroxide, the jarosite precipitate that will be produced will be of the formula: $NH_4Fe_3(SO_4)_2(OH)_6$. Furthermore, the alkali can be added at any point during the electrolytic zinc process. Accordingly, in FIG. 7 the alkali is shown as being added in the hot acid leach step, i.e., in stage two, whereas, for instance, in FIG. 8, which is another embodiment of the instant invention as discussed hereinbelow, the alkali is added in the jarosite precipitation step, i.e., in stage three.

The entire pulp produced from stage three is most preferably returned, i.e., recycled, to stage one for subsequent recovery of the contained zinc (zinc ferrite in the solid and zinc sulfate in the solution, the same having been introduced with the calcine neutralizing agent). This preferred embodiment of the instant invention is depicted in FIG. 7.

In an alternative embodiment of the instant invention, the pulp may be first thickened, as by settling, to produce a decanted solution and a thickened pulp, with the solution being recycled to stage one and the thickened pulp returned, i.e. recycled, to stage two. The latter embodiment is depicted in FIG. 8.

Most basic, the instant process for the electrolytic recovery of zinc differs from all presently known jarosite-iron removal methods, amongst other features, in that the entire jarosite pulp is recycled, thus eliminating the conventional jarosite solid-liquid separation step which is present in all known iron recovery methods.

When the invention is carried out as described above, the following advantages, in addition to the obvious advantage of being able to eliminate an entire jarosite solid/liquid separation step, were obtained over, for instance, the conventional "jarosite process" as well as the "Outokumpu conversion process":

1. the retention time in the ferrite leaching and iron removal stage of the instant invention is identical to that of the "jarosite process" (approximately 3 to 4 hours), however, it is considerably less than that of the "Qutokumpu conversion process" (approximately 24 hours);

2. only one residue is produced for discard which allows for increased washing of the filter cake and thus recovery of more of the water soluble zinc contained in the residue. In the "jarosite process", two residues are generally produced, one of which, the acid leach residue, has poor washing characteristics;

3. dissolution of zinc ferrites is increased as compared to the "jarosite process" since the zinc ferrites remaining in the jarosite pulp are dissolved upon recycle in the subsequent acid leach. This, coupled with the increased washing efficiency, results in an increase of approximately 2% overall zinc extraction. While this is somewhat similar to that obtained in the "Outokumpu conversion process", however, the long reaction times are not required. This 2% increase is, of course, commercially very advantageous;

4. the instant invention greatly enhances the settling and filtering characteristics of the subsequent neutral and acid leaching stages because the coarse jarosite particles, which in the instant invention are recycled, are now present in both of these leach pulps. By contrast, in the "Outokumpu conversion process", the coarse jarosite particles are present only in the acid/jarosite step, and in the "jarosite process" the coarse jarosite particles are present only in the jarosite step. Thus, as compared to the "jarosite process", it was found that the neutral leach filtration rates of the instant invention were doubled and that the hot acid leach filtration rates were trebled;

5. control of the various operating parameters is not so rigid as in the case for either the "jarosite process" or the "Outokumpu conversion process", in that overneutralization in the iron removal step is not as critical. This arises from the fact that any ferric hydroxide (or basic iron sulfates which create settling/filtering problems) would be redissolved upon recycle in the subsequent acid leach step;

6. the equipment required for the instant process is far less than that required in either the "jarosite process" or the "jarosite acid wash process" to produce similar results, viz. one does not require solid/liquid separation equipment after the iron removal step of the "jarosite process" or the wash equipment of the "jarosite acid wash process", or as compared to the "Outokumpu conversion process" where the long reaction times require additional equipment in order that one would be able to treat the same throughput; and 7. the invention was found to remove more ammonium ion from the system when such excessive amounts are present as, for example, in the case where ammonium is added as ammonium persulfate to remove excess manganese from the system—see U.S. patent application Ser. No. 682,442, filed May 3, 1976 and assigned to the assignee of the instant application. This is due to the fact that any other iron compounds precipitated in the iron removal step would redissolve upon recycle in the acid leaching step (jarosite is insoluble under normal acid leaching conditions used in zinc calcine leaching) and as such would be available in solution for reaction with the ammonium ion. This, coupled with the added dissolution of zinc ferrites, results in the formation of more jarosite in the iron removal step and hence increases ammonium ion removal. It has been found that the elimination of the ammonium ion from the circuit was increased by about 8% as compared to the "jarosite process".

The following examples are proferred merely to illustrate the instant invention and are in no way intended to limit the scope of the invention.

EXAMPLES 1 and 2 — COMPARATIVE EXAMPLES

Examples 1 and 2 were performed according to the conventional "jarosite process" (see FIG. 3) so as to serve as a comparison to the instant invention. Both examples were carried out in identical manner as follows:

Jarosite Precipitation

Twenty grams of ammonium sulfate were added to one liter of an acid leach solution having the following analysis: Fe=19 g/l; $H_2SO_4$=25 g/l. The solution was then heated to 95° C. and maintained at that temperature. Zinc calcine, having the following analysis: 57% Zn; 2.8% Mn; and 9.8% Fe, was then added slowly to the acid leach solution for a period of 3.5 hours until the iron content of the solution was reduced to 1 g/l Fe. The pulp was then filtered (in the instant invention such filtration does not take place). The filtrate passed to the neutral leach step and the jarosite precipitate washed and dried.

Neutral Leach

The jarosite filtrate was then combined with one liter of spent electrolyte containing 170 g/l $H_2SO_4$. Calcine was then added and the temperature kept at 65° C., the pulp was at pH 2.0. These conditions were maintained for 30 minutes. More zinc calcine was then added over a period of fifteen minutes, until a pulp of pH 5.0 was obained. The pulp was then alowed to react for one hour at 65° C. The pulp was then filtered and the filter cake was sent to hot acid leaching and the solution to purification.

Hot Acid Leach

The residue (filter cake) from the neutral leach step was then combined with one liter of spend electrolyte containing 170 gms/liter $H_2SO_4$ and 20 grams of ammonium sulfate. The temperature was 95° C. and reaction time 2 hours. The pulp was then filtered and the solution passed to the next jarosite precipitation step, and the residue (leach residue only) washed and dried.

The pertinent results are shown below:

|  | Example 1 | Example 2 |
|---|---|---|
| Calcine to jarosite precipitation, grams | 124 | 135 |
| Jarosite precipitate, grams | 140 | 135.5 |
| % Zn | 8.43 | 9.30 |
| % Mn | 2.25 | 2.88 |
| Calcine to Neutral leach, grams | 301 | 302 |
| Total calcine leached | 425 | 437 |
| Hot acid leach residue weight, grams | 33 | 34 |
| % Zn | 7.20 | 6.93 |
| % Mn | 12.9 | 12.10 |
| Total residue (acid leach + jarosite precipitate) wt, grams | 173 | 169.5 |
| Overall extraction |  |  |
| % Zn | 94.2 | 94.4 |

-continued

|  | Example 1 | Example 2 |
|---|---|---|
| % Mn | 37.7 | 40.1 |

EXAMPLES 3 AND 4

Examples 3 and 4, illustrating the instant invention (see FIG. 7), were carried out in an identical manner as follows, the pertinent data being shown below.

Jarosite Precipitation

Twenty grams of ammonium sulfate were added to one liter of acid leach solution with the following analysis: Fe=19 g/l; $H_2SO_4$=25 g/l. The solution was then heated to 95° C. and maintained at that temperature. Zinc calcine, having the same analysis as in Examples 1 and 2, was then added slowly to the acid leach solution for a period of 3.5 hours until the iron content of the solution was likewise reduced to 1 g/l Fe.

Neutral Leach

The entire pulp, containing precipitated ammonium jarosite, leach residue and zinc sulfate solution, was then combined with one liter of spent electrolyte containing 170 g/l $H_2SO_4$. Calcine was then added to reach a pH 2 and the temperature kept at 65° C. These conditions were maintained for 30 minutes. More zinc calcine was then added over a period of 15 minutes until a pulp of pH 5.0 was obtained. The pulp was then allowed to react for 1 hour at 65° C. The pulp was then filtered and the filter cake was sent to hot acid leaching and solution to purification.

Hot Acid Leaching

The residue from the neutral leach step was then combined with one liter of spent electrolyte containing 170 g/l $H_2SO_4$ and 20 grams of ammonium sulfate. The temperature was 95° C. and reaction time 2 hours. The pulp was then filtered, the solution passed to the iron removal step and the residue (leach residue/jarosite precipitate) washed and dried.

The pertinent results are shown below:

|  | Example 3 | Example 4 |
|---|---|---|
| Calcine to iron removal (jarosite) grams | 128 | 124 |
| Calcine to neutral leach, grams | 305 | 299 |
| Total calcine leached | 433 | 423 |
| Hot acid leach residue/jarosite precipitate weight, grams | 193.5 | 168.3 |
| % Zn | 5.60 | 5.65 |
| % Mn | 3.75 | 4.13 |
| Overall extraction |  |  |
| % Zn | 95.6 | 96.1 |
| % Mn | 40.1 | 41.3 |

The increase in the overall percentage of zinc extraction by the process of the instant invention (Examples 3 and 4) as compared to the conventional "jarosite process" (Examples 1 and 2) is self evident.

The instant invention, as well as the "jarosite process" for comparative purposes, was further tested in an electrolytic zinc pilot plant. Identical zinc calcine was employed as used in the laboratory work. The pilot plant was conducted on a batchwise basis and was sized to produce approximately 100 kg of special high grade zinc per day. In all a total of 5277.75 kg of zinc calcine was processed by the process of the instant invention and a total of 9203.2 kg was processed, for comparative purposes, by the conventional "jarosite process".

EXAMPLES 5 AND 6 — COMPARATIVE EXAMPLES

Figure 1:
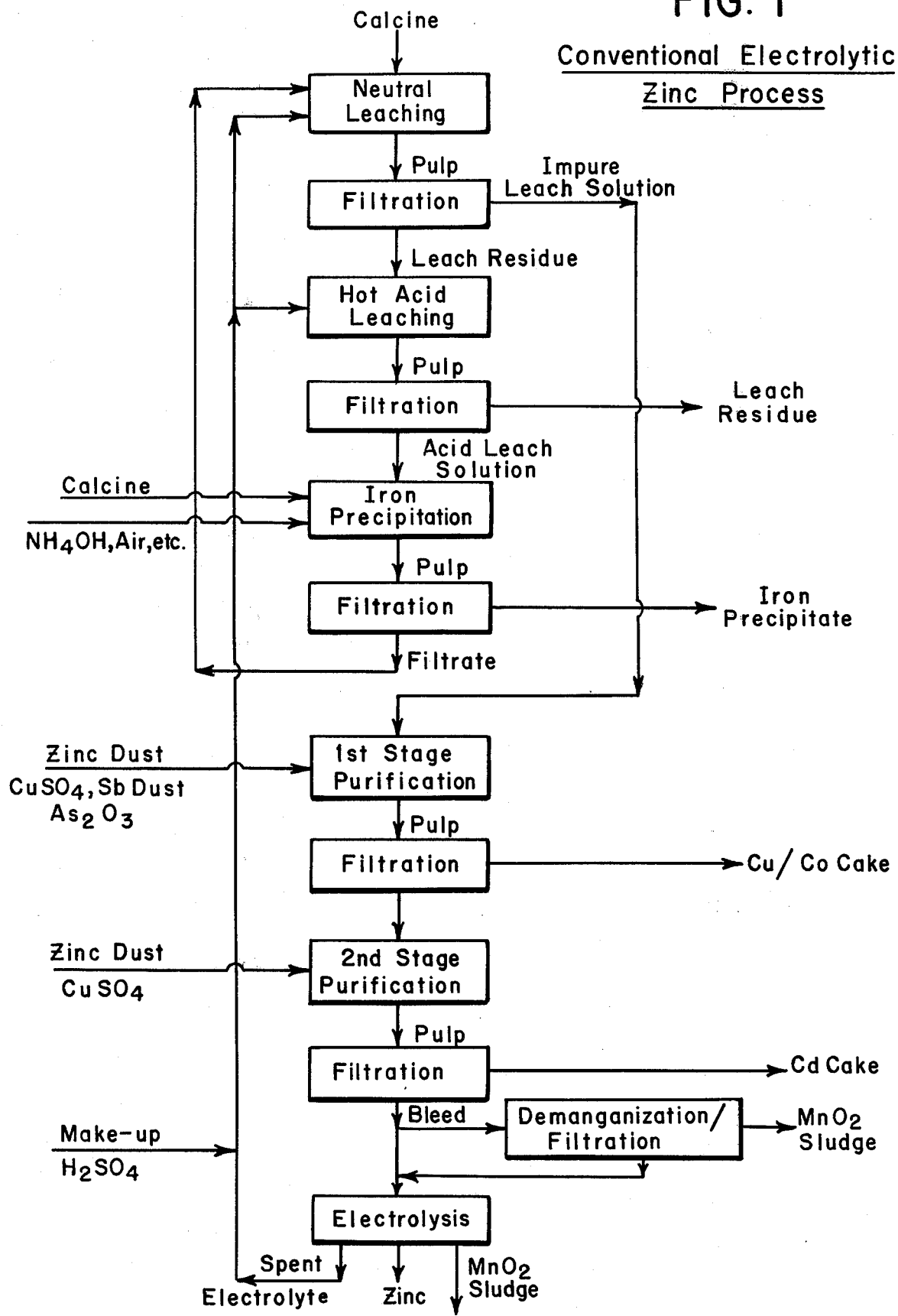
FIG. 1 — presents a general flowsheet of the electrolytic zinc process.
Figure 3:
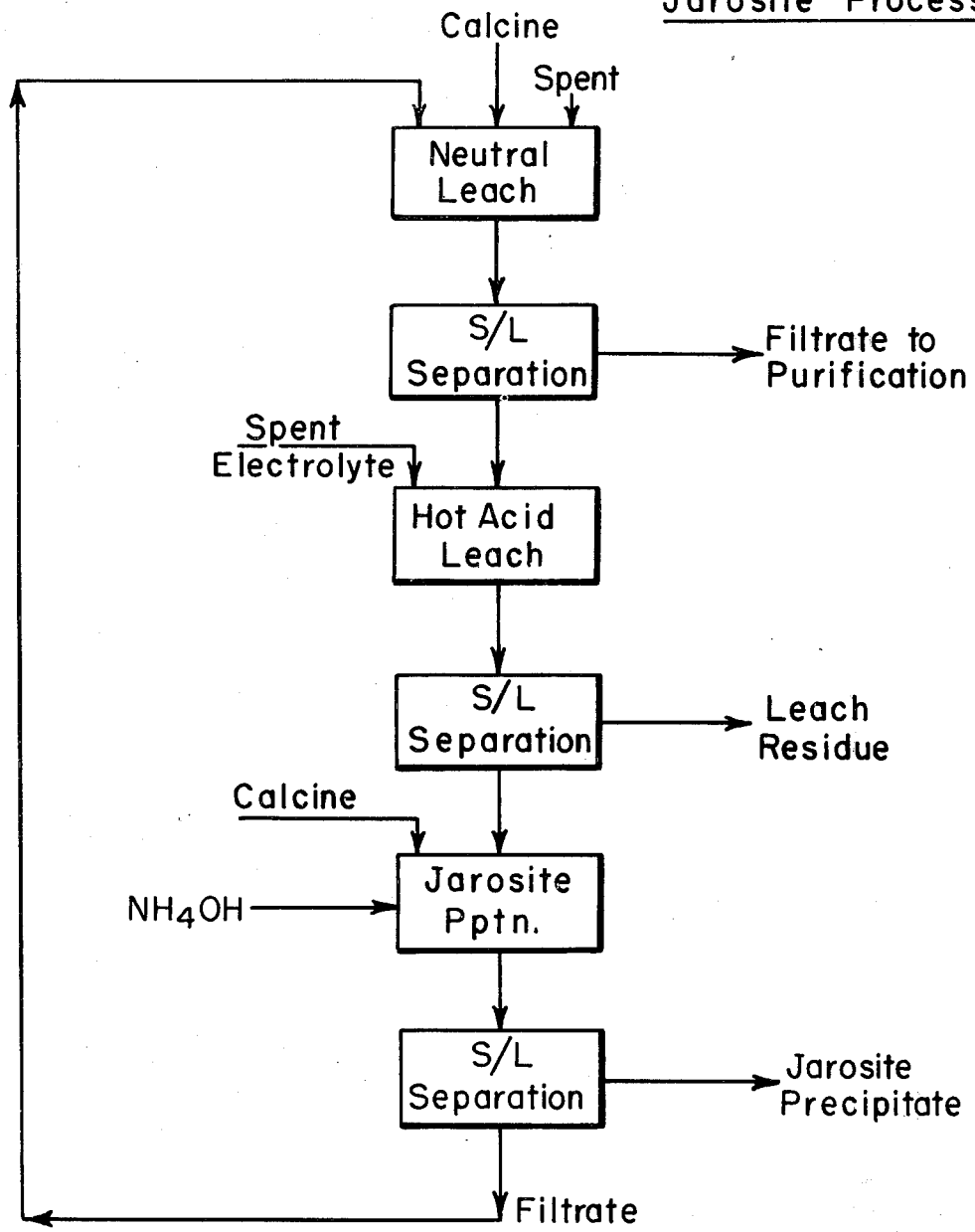
FIG. 3 — presents the flowsheet of the "jarosite process".
Figure 4:
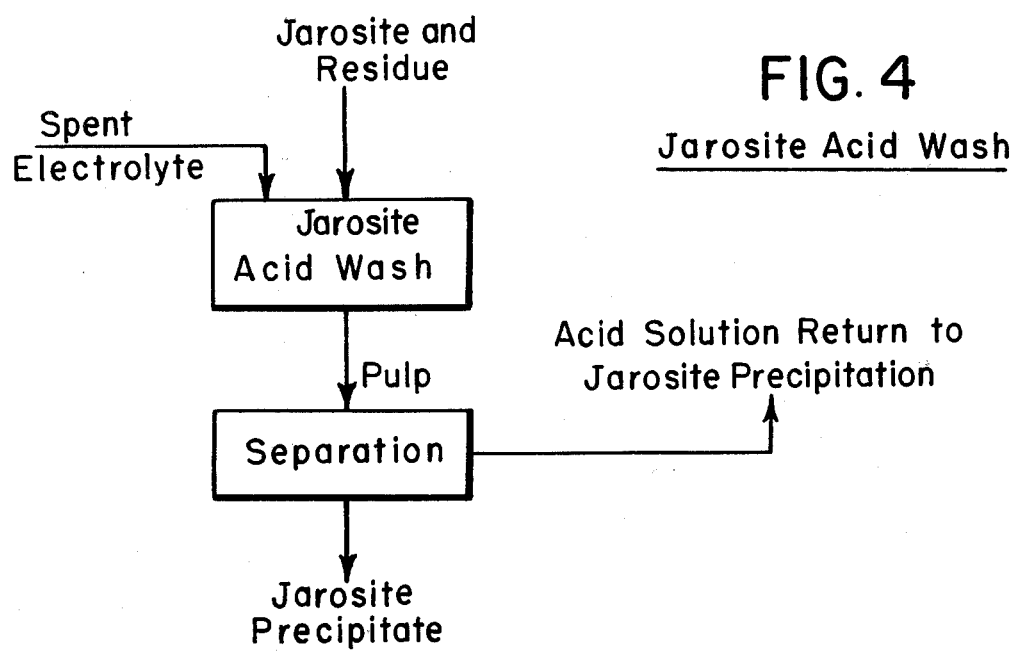
FIG. 4 — presents the flowsheet of the "jarosite acid wash process".
Figure 5:
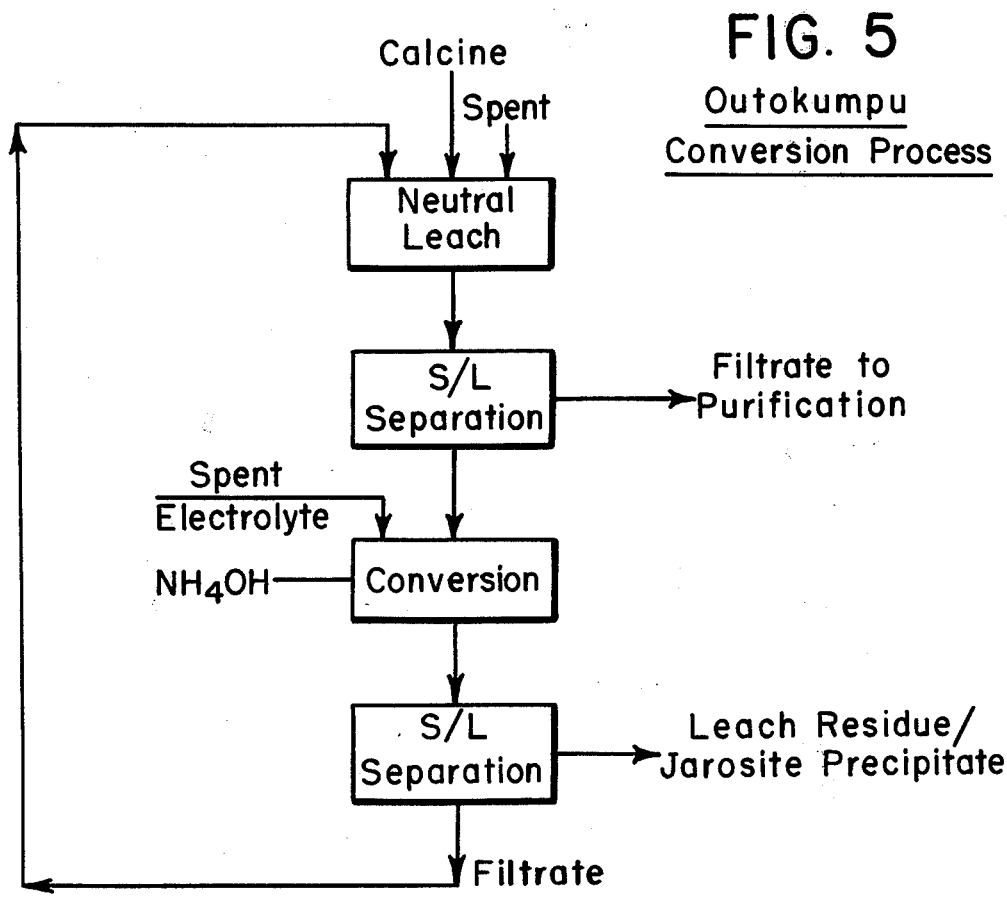
FIG. 5 — presents the flowsheet of the "Outokumpu conversion process".
Figure 6:
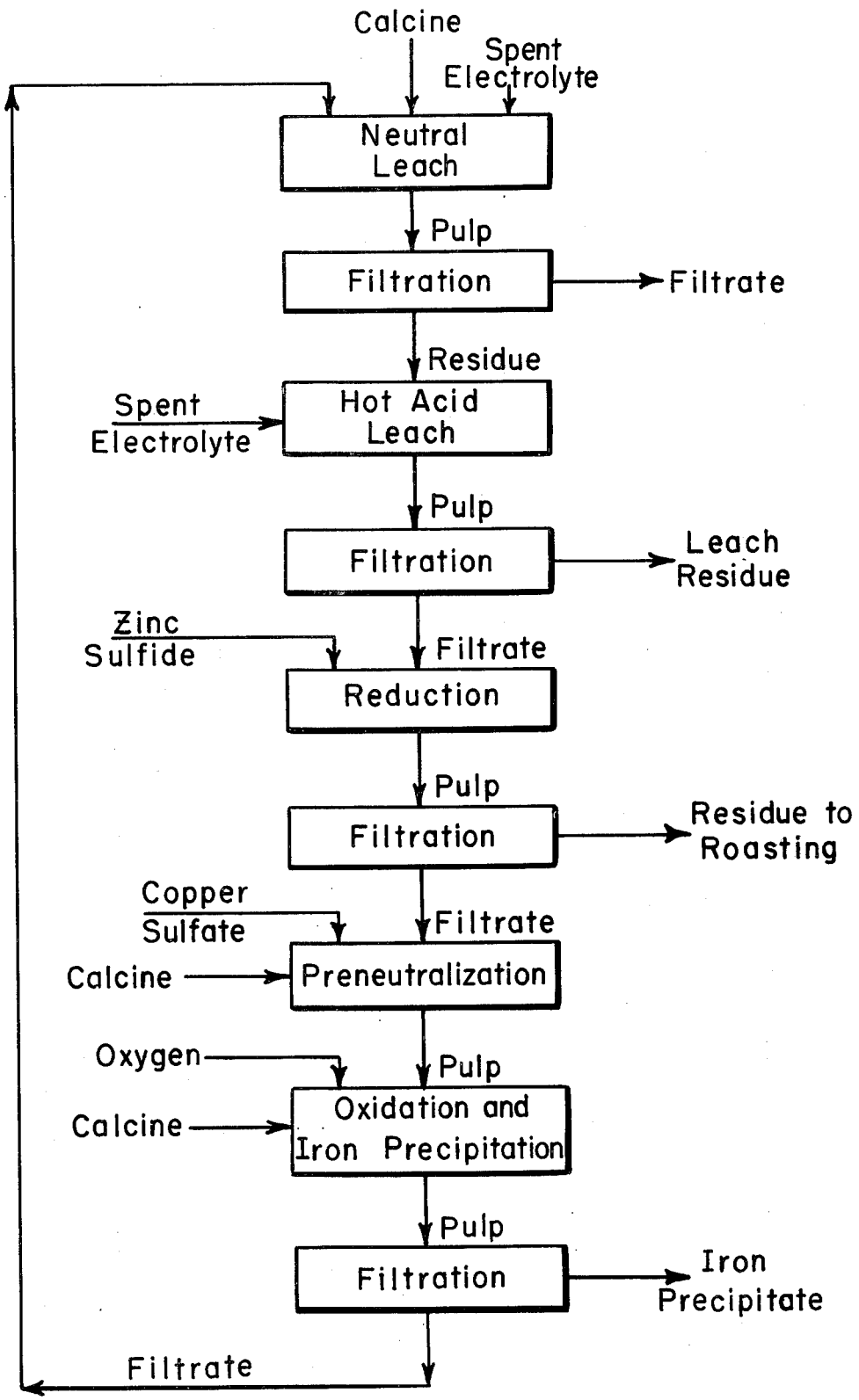
FIG. 6 — presents the flowsheet of the "goethite process".

Examples 5 and 6 show daily results for the leaching and iron removal (jarosite precipitation) steps for the conventional "jarosite process." The procesures used were in all respects similar to that in Examples 1 and 2 with the exception that ammonium ion was introduced from a subsequent process step (see FIGS. 1 and 3). The ammonium ion entered the system as aqueous ammonium sulfate. Spent electrolyte used for leaching was produced via conventional zinc electrolysis and had the approximate analysis: 170 g/l $H_2SO_4$, 60 g/l Zn and 5 g/l Mn.

The pertinent results are shown below:

|  | Example 5 | Example 6 |
|---|---|---|
| Spent acid to neutral leach step, liters | 450 | 450 |
| Calcine to neutral leach step, kg | 160 | 160 |
| Spent acid to hot acid leach, liters | 550 | 550 |
| Acid leach solution |  |  |
| gms/liter Fe | 20 | 19 |
| gms/liter $H_2SO_4$ | 26 | 30 |
| Hot acid leach residue, kg | 19.5 | 19.3 |
| % T/Zn | 13.35 | 14.24 |
| % W/Zn | 0.75 | 1.74 |
| % Mn | 11.44 | 11.78 |
| Calcine to jarosite precipitation, kg | 46.9 | 47.3 |
| Jarosite precipitate, kg | 57.2 | 54.5 |
| % T/Zn | 9.96 | 8.62 |
| % W/Zn | 1.14 | 2.01 |
| % Mn | 1.78 | 2.07 |
| Total Calcine leached, kg. | 206.9 | 207.3 |
| Total residue (leach + jarosite) produced, kg | 76.7 | 73.8 |
| Overall extraction |  |  |
| % Zn | 92.9 | 93.6 |
| % Mn | 44.9 | 41.9 |
| Neutral leach filter rate- kg dry solids/hr/m² filter area | 11.55 | 8.52 |
| Acid leach (leach residue only) filter rate-kg dry solids/hr/m² filter area | 2.35 | 3.33 |

EXAMPLES 7 AND 8

Examples 7 and 8 show typical daily results for the leaching and iron removal (jarosite precipitation) steps of the invention. The procedures used were likewise similar to that given in examples 3 and 4, again with the exception that ammonium ion was introduced from a subsequent process step (see FIGS. 2 and 7). The ammonium iron entered the system as aqueous ammonium sulfate. Spent electrolyte used for leaching was produced via conventional zinc electrolysis and had the approximate analysis 170 g/l $H_2SO_4$, 60 g/l Zn and 5 g/l Mn.

The pertinent results are shown below:

|  | Example 7 | Example 8 |
|---|---|---|
| Spent acid to neutral leach, liters | 450 | 450 |
| Calcine to neutral leach, kilograms | 160 | 160 |
| Spent acid to hot acid leach, liters | 550 | 550 |
| Acid leach solution |  |  |
| gms/liter Fe | 23.0 | 24.4 |
| gms/liter $H_2SO_4$ | 24.0 | 27.2 |
| Calcine to iron removal (jarosite precipitation), kilograms | 39.3 | 41.3 |
| Total calcine leached, kilograms | 199.3 | 201.3 |
| Leach residue/jarosite precipitate weight, kg | 57.5 | 73.2 |
| % T/Zn | 7.8 | 6.10 |
| % W/Zn | 0.78 | 1.20 |
| % Mn | 5.20 | 4.10 |
| Overall extraction |  |  |
| % Zn | 96.1 | 96.0 |
| % Mn | 43.9 | 43.8 |

-continued

|  | Example 7 | Example 8 |
|---|---|---|
| Neutral leach filter rate-kg dry solids/hr/m² filter area | 19.11 | 20.16 |
| Acid leach (leach residue + jarosite precipitate) filter rate-kg dry solids/hr/m² filter area | 11.79 | 6.56 |

Again, a comparison between Examples 5/6 and Examples 7/8 demonstrates the improved yield in overall zinc extraction, 96.1% and 96.0% for the process of the instant invention vs. 92.9% and 93.6% for the conventional "jarosite process." Moreover, these examples also establish the substantially improved neutral leach and acid leach filtration rates for the process of the instant invention as compared to that of the conventional "jarosite process".

EXAMPLE 9

This Example shows the average daily ammonium ion removal, in kilograms, for the invention vs. the "jarosite process", as conducted in the noted pilot plant testing. The average was taken over 15 days of operation of the pilot plant for the "jarosite process" and 29 days for the invention. This Example also demonstrates the improved overall Zn extraction rates as well as the improved overall neutral leach and acid leach filtration rates for the period of operation of the pilot plant:

|  | "Jarosite Process" | Invention |
|---|---|---|
| Kilograms NH₄ removed from system (as ammonium jarosite) per day | 1.06 kg | 1.15 kg |
| Overall Zn extraction rate - % | 92.1 | 94.1 |
| Filtration rates - kg dry solids/hr/m² filter area |  |  |
| Neutral Leach | 9.4 | 18.0 |
| Acid Leach | 2.8 | 8.4 |

We claim:

1. A process for the treatment of zinc calcine containing zinc oxides, zinc sulfates and zinc ferrites for the recovery of zinc which comprises:
(a)(1) neutral leaching the zinc calcine with an effective volume of an aqueous sulfuric acid containing solution to dissolve a substantial amount of the zinc oxides and the zinc sulfates, and thereafter contacting the resulting pulp with an effective amount of a neutralizing agent to neutralize the acid content of the pulp, and
(2) separating the solids and liquid to produce an impure solution filtrate and a neutral leach residue;
(b) (1) hot acid leaching the neutral leach residue with an effective volume of aqueous sulfuric acid containing solution to dissolve a substantial amount of the zinc ferrites, and
(2) separating the solids and liquid to produce an acid leach solution and an acid leach residue, said acid leach residue containing jarosite precipitate recycled from step (c)(2);
(c)(1) contacting the acid leach solution with an effective amount of a neutralizing agent and in the presence of an effective amount of an alkali to precipitate the ferric iron as jarosite, and
(2) recycling the resulting pulp to step (a)(1).

2. The process of claim 1 wherein the aqueous sulfuric acid containing solution added in step (a)(1) is added in an amount to yield an initial pH of from about 1.4 to 2.5.

3. The process of claim 2 wherein the pH is about 2.

4. The process of claim 1 wherein the neutralizing agent added in step (a)(1) is added in an amount to yield a subsequent pH of from about 4.0 to 5.3.

5. The process of claim 4 wherein the pH is about 5.

6. The process of claim 1 wherein the neutralizing agent added in step (a)(1) is zinc calcine.

7. The process of claim 1 wherein the aqueous sulfuric acid containing solution added in step (b)(1) is added in an amount to yield a final acid concentration of about 20–50 grams/liter $H_2SO_4$.

8. The process of claim 1 wherein the aqueous sulfuric acid containing solution in steps (a)(1) and (b)(1) is return acid, spent electrolyte or new dilute sulfuric acid.

9. The process of claim 1 wherein step (a)(1) is carried out at a temperature of from about 50° C. to 90° C.

10. The process of claim 1 wherein the temperature is about 65° C.

11. The process of claim 1 wherein steps (b)(1) and (c)(1) are carried out at a temperature of from about 80° C. to the boiling point.

12. The process of claim 11 wherein the temperature is greater than about 90° C.

13. The process of claim 1 wherein the neutralizing agent added in step (c)(1) is added in an amount to reduce the acid concentration to below about 20 grams/liter $H_2SO_4$.

14. The process of claim 13 wherein the acid concentration is below about 10 grams/liter $H_2SO_4$.

15. The process of claim 1 wherein the neutralizing agent added in step (c)(1) is zinc calcine.

16. The process of claim 1 wherein the alkali present in step (c)(1) is present in an amount from about 2 to 6 grams/liter.

17. The process of claim 1 wherein the alkali present in step (c)(1) is added in step (b)(1).

18. The process of claim 1 wherein the alkali present in step (c)(1) is added in step (c)(1).

19. The process of claim 1 wherein the alkali present in step (c)(1) is a compound containing ammonium, sodium, potassium, hydroxide, sulfate or carbonate ions.

20. The process of claim 19 wherein the alkali is ammonium hydroxide.

* * * * *